United States Patent [19]

Mrazek

[11] 3,835,458

[45] Sept. 10, 1974

[54] DIE TEMPERATURE CONTROLLED PROGRAMMING OF IC MEMORY DEVICE

[76] Inventor: Dale Mrazek, 27876 Via Ventana, Los Altos Hills, Calif. 94022

[22] Filed: Dec. 3, 1973

[21] Appl. No.: 421,411

[52] U.S. Cl. ........ 340/173 R, 307/310, 340/173 SP

[51] Int. Cl. .................................................. G11c 7/04

[58] Field of Search.... 340/173 R, 173 SP, 173 DR; 307/238, 310; 317/235 Q; 324/105

[56] References Cited

UNITED STATES PATENTS

| | | | |
|---|---|---|---|
| 3,462,317 | 8/1969 | Baum et al | 317/235 Q |
| 3,703,651 | 11/1972 | Blowers | 317/235 Q |
| 3,705,392 | 12/1972 | Appelt | 340/173 DR |
| 3,725,789 | 4/1973 | Mager | 307/310 |

*Primary Examiner*—Stuart N. Hecker

[57] ABSTRACT

The programming pulse rate of an integrated circuit memory array such as a voltage stressed programmable read only memory is controlled by sensing the temperature of the IC die. The memory device is rapidly pulsed until a preselected safe ceiling temperature is reached, and thereafter the rate of application of the pulses is controlled to maintain the temperature of the die at or near the safe ceiling temperature. The temperature of the die is sensed by measuring the voltage drop across a diode within the IC circuit, this voltage drop being a function of the temperature of the die, and the rate of pulsing of an oscillator, and thus the rate of application of the programming power pulses, is controlled in accordance with the diode voltage.

10 Claims, 4 Drawing Figures

DIE TEMPERATURE CONTROLLED PROGRAMMING OF IC MEMORY DEVICE

BACKGROUND OF THE INVENTION

The standard method for programming voltage stressed memory arrays such as programmable read only memory arrays (PROM) utilizes a pulsing technique where each of the separate memory nodes has applied thereto a fixed series of high power pulses, groups of memory nodes being addressed in sequence. For example, in a typical PROM mounted in a twenty-four pin package, there are 2048 memory locations comprising 256 words of 8 bits and thus 256 separate addresses in programming a package; these 256 addresses are made in sequence during programming.

In programming, a current of 700 ma at 50 volts, and therefore a power of 35 watts, is applied to the memory nodes for a total time of 100 milliseconds. Because of the damage to the wafer that would occur as a result of the high temperature to which small wafer would rise by applying such power continuously, the power is applied in short pulses with a small duty cycle, for example 2 percent duty cycle, to allow the chip to cool between power pulses. This pulsing is set by a timing arrangement from a clock or one shot logic circuit. As a typical example, the power may be applied in 10 separate pulses, each pulsing lasting 10 milliseconds, the pulses being repeated every 500 milliseconds. Or the power may be applied in 5 separate pulses, each pulse lasting 20 milliseconds, the pulses being repeated every 1,000 milliseconds. In either case, the total elapsed time for making all of the 256 addresses in sequence for a twenty-four pin package PROM is approximately 26 minutes. In production testing, each PROM is programmed with three different programs, with erasure between programming, to ensure its correct functioning. With the erasure in ultraviolet light taking about five minutes per erasure per package, the total production testing time for each PROM is over one and one half hours.

SUMMARY OF THE PRESENT INVENTION

The present invention provides a novel method and apparatus for reducing significantly the programming time for an integrated circuit memory array. This method and apparatus operates to continuously sense the temperature of the memory array wafer or die and to control the timing of the applied power pulses in response to the sensed temperature. The power pulses are applied initially to the wafer rapidly until such time as a preselected safe temperature ceiling is reached, at which time the pulsing is interrupted until the wafer has cooled to a safe temperature, the pulse timing being thereafter controlled in response to the temperature of the wafer so that the power pulses are applied as rapidly as possible without having the temperature of the semiconductor wafer exceed the safe temperature ceiling.

The temperature of the wafer is sensed by measuring the temperature sensitive voltage drop across a diode inherently present on the wafer in circuit between two of the external leads to the wafer. This voltage measurement is used to control a program control oscillator to change the pulse rate output of the oscillator in dependence on the temperature of the wafer.

DESCRIPTION OF THE PREFERRED EMBODIMENTS

Figure 1:
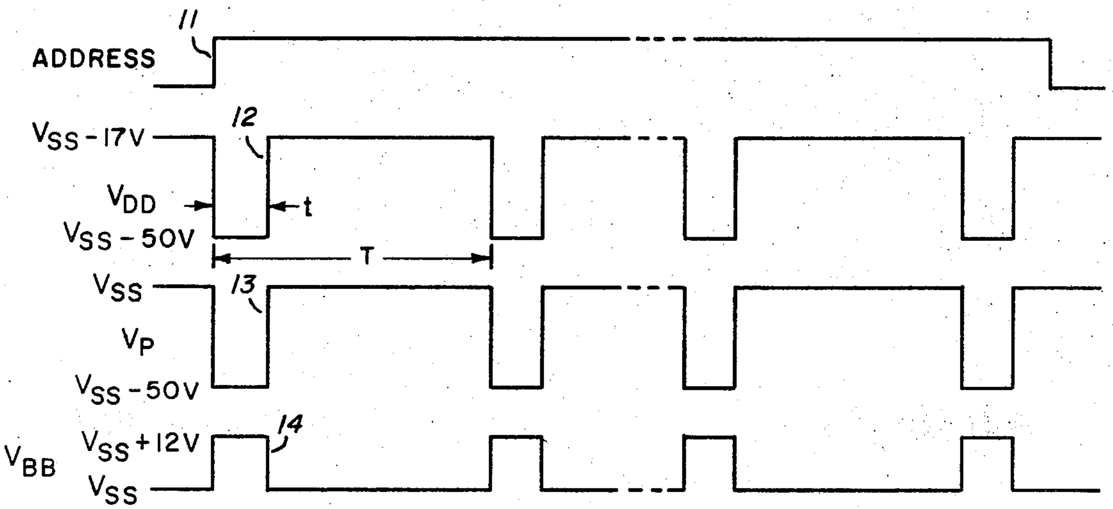
FIG. 1 is a timing diagram illustrating the voltages on certain terminals of a PROM package during voltage stress programming of the PROM.

Referring to FIG. 1 there is shown a timing diagram illustrating a known power pulsing technique used for programming conventional PROM devices by voltage stressing; the PROM may employ floating gate MOS devices or the structure may be a bipolar fusable link PROM. Trace 11 shows one of the stable addresses set up at the PROM input to select certain memory nodes for information storage. The voltages applied to the drain input ($V_{DD}$), the program input ($V_p$), and the bulk input ($V_{BB}$) of the PROM package relative to the source voltage input ($V_{SS}$) are shown as traces 12, 13 and 14, respectively. During each power pulse application for voltage stressing, $V_{DD}$ is changed from a value of $V_{SS} - 17V$ to $V_{SS} - 50V$; $V_P$ is changed from $V_{SS}$ to $V_{SS} - 50V$; and $V_{BB}$ is changed from $V_{SS}$ to $V_{SS} + 12V$. The duty cycle for each power pulse ($V_{DD}$) is 2 percent; i.e., the time t of the pulse is 2 percent of the total period T between consecutive pulses. This long delay time between power pulses permits the die to cool down and maintain a safe overall temperature during programming. For each address, a number of power pulses are applied to give a total pulse time of 100 milliseconds. Therefore, if each power pulse ($V_{DD}$) is 10 milliseconds duration, then 10 separate pulse are applied during each address. Thereafter, address is indexed by one and the PROM control word is changed and the new memory nodes are voltage stressed with the next series of 10 power pulses. As explained above, this technique of programming takes a very long time because of the fixed, low percentage duty cycle for the power pulses.

Figure 2:
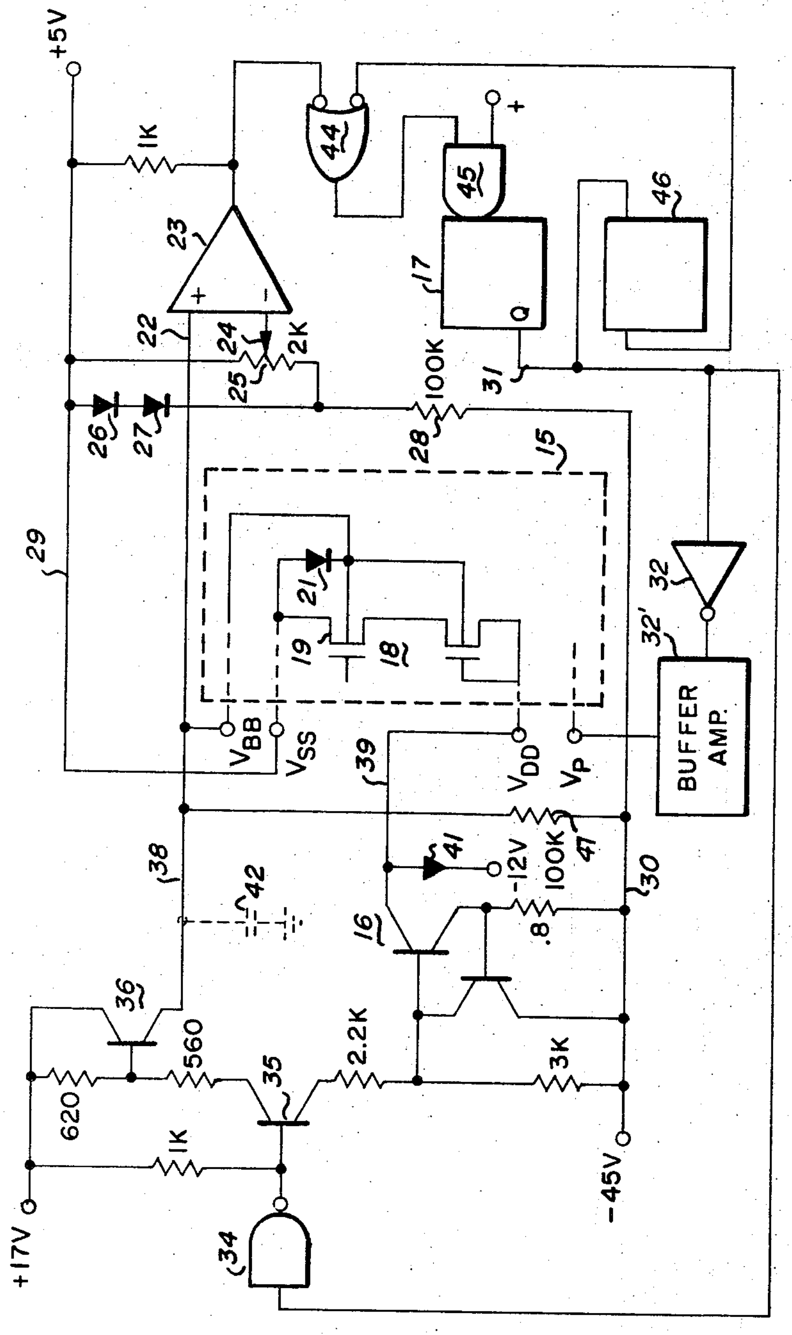
FIG. 2 is a schematic diagram of the thermal rate oscillator utilized to regulate the power pulsing responsive to the die temperature.

Referring now to FIG. 2 there is shown a thermal rate oscillator circuit utilized to control the rate of power pulsing of a solid state memory device, such as a PROM for voltage stressing the device. A typical known form of PROM device is represented by the outline 15 and shows four of the standard output terminals $V_{BB}$, $V_{SS}$, $V_{DD}$ and $V_P$. A small portion of the well known circuitry of the PROM, for example a MOS transistor inverter circuit, associated with the terminals $V_{BB}$, $V_{SS}$, and $V_{DD}$ useful in explaining the operation of the present invention is shown within the outline 15. A power pulse circuit 16 is shown for providing the 700 ma power pulses to the input terminal ($V_{DD}$) of the device. The power pulse circuit is controlled from a one shot circuit 17 as explained below.

One transistor 18 of many similar transistors within the package is shown with its source 19 connected to the $V_{SS}$ terminal of the package and with the bulk region of the die connected to the $V_{BB}$ terminal. By the very nature of the MOS transistor device, the junction between the source region and the bulk region forms a phantom diode 21 which, in the normal operation of the transistor performs no useful function but which, in the present instance, is used as temperature sensor. As seen, the phantom diode 21 is located across the two terminals $V_{SS}$ and $V_{BB}$ and is located internally of the memory array.

Figure 3:
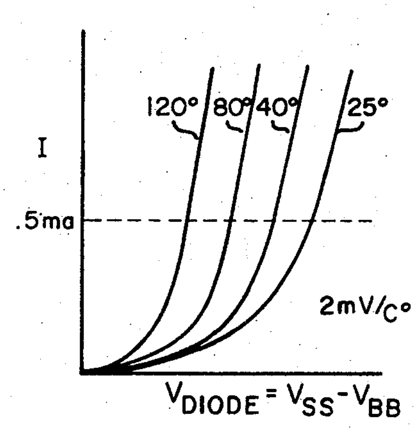
FIG. 3 illustrates the relationship between temperature and voltage of a diode in the PROM.

The temperature characteristics of this diode 21 are shown in FIG. 3 where the voltage across the diode, $V_{DIODE} = V_{SS} - B_{BB}$, is plotted versus current I through the diode for different operating temperatures. At a selected current I of, for example, .5ma, $V_{DIODE}$ decreases for increasing temperatures. The voltage across the diode with the die operating at 125°C is less than the voltage across the diode when the die is operating at 80°C. This change in diode voltage with operating temperature changes for the IC package is utilized to control the oscillator of FIG. 2 and thus control the rate of application of the power pulses on the terminal $V_{DD}$ of the package 15.

The output terminal $V_{BB}$ of the package 15 is connected to the positive input 22 of a sense amplifier 23. The negative input of the sense amplifier 23 is coupled to the movable tap 24 on a potentiometer 25 which is coupled in parallel with the two diodes 26 and 27 in a series circuit including the resistor 28 across the $V_{SS}$ rail 29 at +5V and the −45V rail 30. A constant current flows through the series circuit comprising the diodes 26 and 27 and the resistor 28 and the potentiometer tap 24 is set to provide a reference voltage ($V_{REF}$) on the negative input of the sense amplifier 23 which is equal to $V_{SS} - XV_{DIODE}$ where X is some selected fraction of a diode voltage drop. The operation of the thermal rate oscillator of FIG. 2 will be described, and reference will be made to the traces of FIG. 4 as an aid in understanding the operation.

Assume that a PROM 15 is coupled to the oscillator of FIG. 2 as shown and that the circuit is operating to program the PROM, with the one shot circuit 17 operated such that a high exists on the Q output 31. This high operates the buffer amplifier 32′ via the inverter 32 to apply the desired voltage pulse to the $V_P$ input.

Figure 4:
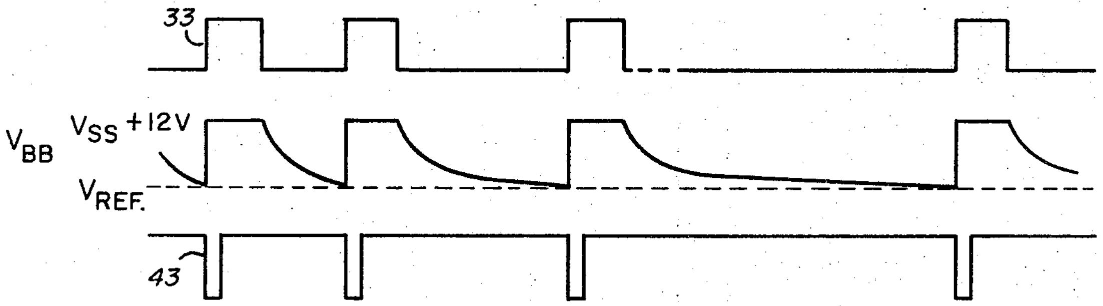
FIG. 4 is a timing diagram illustrating the operation of the circuit of FIG. 2.

The one shot 17 is set to produce a 10 to 15 millisecond pulse on the output 31, and this pulse is shown by the trace 33 of FIG. 4. The positive pulse on output 31 also controls the NAND gate 34, causing the output of the NAND gate 34 to go low, turning transistor 35 on. Transistor 35 controls both the $V_{BB}$ switch circuit 36 and the $V_{DD}$ switch circuit 16, and when transistor 35 is turned on, the $V_{BB}$ line 38 goes to $V_{SS} + 12$ as shown in FIG. 4 and the $V_{DD}$ line 39 goes from $V_{SS} - 17V$ to $V_{SS} - 50V$ as indicated by the $V_{DD}$ power pulse trace of FIG. 1.

When the one shot 17 operates to terminate the positive going pulse 33 on line 31, the power pulse on $V_{DD}$ is terminated since transistor 35 is turned off, operating switch 16 to return the $V_{DD}$ line 39 to $V_{SS} - 17V$ (via diode 41). Switch 36 is turned off and the voltage on the terminal $V_{BB}$ starts to decay. This voltage decays as a result of the pressure of an RC circuit coupled to line 38 comprising the resistor 47 and the effective diode capacitance 42 present on terminal $V_{BB}$ from the circuitry within the package 15.

If the die within the package 15 is cool, then the voltage across the diode 21 is relatively high as illustrated by FIG. 3, and the voltage on $V_{BB}$ at the positive input of the sense amplifier 23 will drop rapidly to the level of the reference voltage ($V_{REF}$) on the negative input of the sense amplifier, for example, within one millisecond. The output of the sense amplifier will go low (trace 43 in FIG. 4) to the gate 44 which operates via gate 45 to trigger the one shot 17 and produce a high on output 31. Another power pulse is produced on terminal $V_{DD}$ since the switches 36 and 37 are again operated as described above, with the output of the sense amplifier 23 returning high. This cycle will continue with power pulses being applied rapidly to the package 15 with a very high duty cycle. The one shot 17 determines the time duration $t_1$ of the power pulse applied to $V_{DD}$ and the decay time of the $V_{BB}$ pulse of FIG. 4 to the reference level ($V_{REF}$) determining the time between power pulses. With a cool die, the time between power pulse is less than 10 percent of the time of the power pulse.

This rapid pulsing will continue until the die heats up to a safe temperature level, this temperature level being established by the setting of the tap 24 on the potentiometer 25 which establishes the reference voltage level at the sense amplifier; a typical safe temperature ceiling is 125°C. When the die exceeds this temperature level, the voltage drop across the diode 21 will maintain the voltage applied to the positive input of the sense amplifier 23 more positive than the reference voltage ($V_{REF}$) at the negative input, when the last power pulse is terminated and the output of the sense amplifier will remain high. The decay of the $V_{BB}$ pulse is extended as illustrated in FIG. 4 until the temperature of the die decreases to the safe level, for example 125°C, at which time the voltage $V_{BB}$ coicides with the reference voltage $V_{REF}$, the sense amplifier output again going low to trigger the one shot 17 and initiate another power pulse. The time duration of the power pulse is determined by the setting of the one shot 17, whereas the time delay between power pulses is determined by the temperature of the die in the package 23 as sensed by the diode 21 between the $V_{SS}$ and $V_{BB}$ terminals. Only when the temperature of the die is below the safe ceiling level as determined by the voltage drop across diode 21 will the sense amplifier 23 operate to trigger a new power pulse. The variable delay between pulses is illustrated by the $V_{BB}$ trace in FIG. 4.

Techniques can be employed to increase the pulse rate by decreasing the temperature of the die under programming, for example by blowing cooling air over the package or by programming the die before packaging and while the die is positioned on a heat sink such as the metal chucks on which the die is held during testing.

In any event, the total time for programming a PROM has been reduced from about 26 minutes to less than 4 minutes.

If the programming of the PROM is done before the PROM is packaged and while the wafer is still on one of the heavy metal wafer chucks used in processing, the power pulsing can be carried out at a very high rate because the metal chuck serves to carry heat away from the wafer. Also, if a stream of cooling air is directed across the wafer or the IC package during programming, the rate of pulse application is increased. For example, the total time for programming a PROM may be reduced from the 26 minutes now taken to a time less than 4 minutes, with the wafer temperature held to less than 125°C during the entire processing.

Another one shot circuit 46 with a long time interval of 400 to 500 milliseconds is employed to insure that the oscillator circuit will initially start at the beginning of any programming run.

A number of PROM devices may be programmed in parallel, with the diodes 21 of the different packages coupled in parallel to the thermal rate oscillator of FIG. 2. The hottest die of the plurality will control the operation of the sense amplifier to regulate the rate of application of the power pulses, and the pulses will be applied to the packages as fast as the die with the most elevated temperature will permit.

Although the invention was described as it relates to the programming of a voltage stressed PROM employing charging of floating gates, the invention is equally applicable to the voltage stressing of programmable fusable link PROM's.

What is claimed is:

1. The method of programming an integrated circuit memory array with voltage stressing power pulses comprising the steps of producing a series of power pulses for application to the memory nodes of the memory array, sensing the temperature of the integrated circuit die, and controlling the rate of application of said power pulses to said integrated circuit in response to the level of said sensed temperature.

2. The method as claimed in claim 1 wherein the step of sensing the temperature of the integrated circuit die comprises the step of sensing the voltage drop across a diode in said integrated circuit.

3. The method as claimed in claim 2 wherein said integrated circuit memory array is a programmable read only memory array and said diode is the phantom diode appearing across the bulk and source terminals of said circuit.

4. Apparatus for programming an integrated circuit memory array with voltage stressing power pulses comprising means for producing a series of power pulses for application to the memory nodes of the memory array, means for sensing the temperature of the integrated circuit die, and means responsive to the level of said sensed temperature for controlling the rate of application of said power pulses to said integrated circuit.

5. Apparatus as claimed in claim 4 wherein the means for sensing the temperature of the integrated circuit die comprises means for sensing the voltage drop across a diode in said integrated circuit.

6. Apparatus as claimed in claim 5 wherein said integrated circuit memory array is a programmable read only memory array and said diode is the phantom diode appearing across the bulk and source terminals of said circuit.

7. Apparatus as claimed in claim 4 wherein said means for producing a series of power pulses comprising a pulse generating oscillator circuit, said means for controlling the pulse rate comprising means for controlling the period of operation of said oscillator.

8. Apparatus as claimed in claim 7 wherein said means for sensing the temperature of the integrated circuit die comprises means for sensing the voltage drop across a diode in said integrated circuit.

9. The apparatus as claimed in claim 8 wherein said integrated circuit memory array in a programmable read only memory array and said diode is the phantom diode appearing across the bulk and source terminals of said circuit.

10. Apparatus as claimed in claim 9 wherein said means for controlling the rate of application of said power pulses comprises a sense amplifier have one input coupled to said bulk terminals and another input coupled to a source of reference voltage.

* * * * *

UNITED STATES PATENT OFFICE

CERTIFICATE OF CORRECTION

Patent No. 3,835,458 Dated September 10, 1974

Inventor(s) Dale A. Mrazek

It is certified that error appears in the above-identified patent and that said Letters Patent are hereby corrected as shown below:

In the drawings, Sheet 2, Fig. 2, place an arrow directed downwardly on the upper elements leading to the base of each of the two PNP transistors 35 and 36 and place an arrow directed downwardly on the lower elements leading away from the base of each of the two NPN transistors in the switch labeled 16.

Signed and Sealed this

Twentieth Day of July 1976

[SEAL]

*Attest:*

RUTH C. MASON
*Attesting Officer*

C. MARSHALL DANN
*Commissioner of Patents and Trademarks*